APPLICATOR FOR DISPENSING A MOLTEN MATERIAL

Original Filed Aug. 2, 1967 2 Sheets-Sheet 1

APPLICATOR FOR DISPENSING A MOLTEN MATERIAL

Original Filed Aug. 2, 1967 2 Sheets-Sheet 2

United States Patent Office

Re. 27,828
Patented Dec. 4, 1973

27,828
APPLICATOR FOR DISPENSING A MOLTEN MATERIAL

Albert R. Salonen, 560 Baxter Ave., Victoria, British Columbia, Canada

Original No. 3,550,815, dated Dec. 29, 1970, Ser. No. 657,983, Aug. 2, 1967. Application for reissue Nov. 26, 1971, Ser. No. 202,078
Int. Cl. B67d 5/62
U.S. Cl. 222—146 HE 20 Claims

Matter enclosed in heavy brackets [ ] appears in the original patent but forms no part of this reissue specification; matter printed in italics indicates the additions made by reissue.

ABSTRACT OF THE DISCLOSURE

An applicator for dispensing a molten material which includes a container for material to be melted; a heating chamber forward of and communicating with the container in which chamber the said material is melted; one or more nozzles forward of and communicating with the heating chamber to supply the molten material; means operable to force material in the container through the heating chamber and subsequently through the or each nozzle; and motor means for operating said material forcing means. The applicator is particular suitable for hand-held operation.

*This application is a reissue of Ser. No. 657,983 filed Aug. 2, 1967, now U.S. Pat. No. 3,550,815, patented on Dec. 29, 1970.*

This invention relates to an applicator for dispensing a molten material, primarily for adhesive but possibly for molding purposes. More particularly, it relates to a hand-held hot metal adhesive extruder, which meets the requirements of high speed application, and independence from any other associated equipment other than a standard electrical outlet.

The application of thermoplastic materials as hot melt adhesives, calking compounds, sealants, and other similar uses has been severely limited due to the lack of suitable applicators. The applicator described below, however, is unique in that it is a self-contained motor driven unit which can be hand held, and operated with the ease of, for example, an electrically operated hand drill. Further, sufficient thermoplastic material either in pellet or granular form can be contained in the apparatus to do any reasonable job. Also, this novel applicator has a pistol-grip-type handle, and is relatively light, so that it can be readily manipulated by one hand, leaving the other hand of the operator free to perform other operations.

A broad aspect of the invention is accordingly to provide a gun-type applicator for dispensing a molten material for adhesive or molding purposes, comprising: a container for material to be melted; a heating chamber forward of and communicating with the container, in which chamber the said material is melted; one or more nozzles forward of and communicating with the heating chamber to supply the molten material; plunger means to force material in the container through the heating chamber and subsequently through the or each nozzle; and motor means forming part of, and mounted towards the rear of the gun-type applicator, to operate said plunger.

An object of the invention is to provide a hand-held hot melt adhesive extruder that will handle the stock plastic in pellet or granular form. The advantage here is obvious in lower cost for the material, its greater availability and ease of handling.

Another object is to provide a hand-held hot melt adhesive extruder which can be operated with a minimum of physical effort and attention on the part of the operator. This may be best accomplished by utilizing an electric motor as the motor means to provide the necessary power to do the actual extruding of the plastic material; normally such a motor will be aligned with the plunger to avoid complicated bevel gearing.

The device can be hand held due to three important innovations.

Firstly, the device can be hand held because of its basic structural design and the balance which has beer incorporated into it. The fundamental design which permits the use of the device as a hand-held apparatus consists primarily of the disposition of a drive motor above and slightly rearwardly of the upper end of the hand grip of the applicator, and of a plunger mechanism, which is disposed forwardly of the motor for operation thereby, and which moves pellets of thermoplastic material from a container or reservoir through a heating section where the material becomes molten. The design is usually such that the plunger mechanism has sufficient force to drive the pellets through a narrow passageway, formed between a central, heated, conical-shaped obstruction and the outer confining walls of the heating chamber. The plunger then moves this molten thermoplastic material out through an orifice. This method of moving the thermoplastic material does not allow the heat to flow back through the apparatus as would a method employing a screw mechanism. Thus, large cooling units employing water or air, which would have to be used for almost any other mechanism, are eliminated and the device is kept to a manageable size. Further, the design, mounting and location of the motor, thermoplastic reservoir, handle, trigger mechanism, plunger device and heating elements can be readily adjusted to give the apparatus the required compactness and balance to be hand held.

Secondly, the device can be hand held because of its lightweight. The apparatus may be designed and constructed with the maximum possible usage of light alloys of aluminum and magnesim. This eliminates much of the weight which would have been present if the more common alloys of steel were used. Thus, the lightness due to the use of these alloys in the construction of the device is an inherent factor in its applicability as a hand-held apparatus and is an important factor in the uniqueness of the invention.

Thirdly, the device can be hand held because the handle remains at a comfortable temperature over long periods of continuous use. This is improved if a heat dam, i.e., a heat-insulating barrier is used between the heating chamber and the main container of the mechanism to keep the piston working freely, the hopper cool with its load of fresh material, and the handle cool. This innovation enables the device to be constituted in a compact hand-held form.

Due to its unique lightness and mobility, therefore, this device enables thermoplastics to be used in many ways which, until now, have been impossible. For example, any operator will be able to easily and instantly seal a wide variety of packaging containers, such as cartons, in different physical locations dependent only on a normal electrical outlet. This applicator will also permit the use of thermoplastic materials as calking and sealing compounds since it is the first device that can adequately dispense thermoplastic material in the manner required.

At present there is a wide range of thermoplastic materials and blends of thermoplastics on the market which are suitable for use in such a device. Pellets of thermoplastic material are easily fed (even by gravity feed) into the device from some external supply such as a self-contained cartridge, or from an external reservoir, e.g., by means of a flexible, internally smooth tube.

The apparatus eliminates the problem of oxygen degrading of the thermoplastic materials upon long standing at high temperatures. The thermoplastic material is melted and extruded only as needed. There is no large reservoir of material held at a high temperature as is common in most applicators. This prevents any loss of the solvent characteristics of the thermoplastics.

When the applicator is not being used, a small amount of the thermoplastic material may solidify in the tip of the device but this is remelted when the applicator is again plugged into the electrical outlet.

The heating chamber preferably employs two (or more) separate heating elements. The mounting of the two heating elements within the heating section is such that their heat is applied directly to both an inner coaxially mounted, conical ended core and the outer walls of the heating chamber. The enclosures for the heating elements also serve as the mounting for the inner conical ended core. The conical ended core, (facing towards said plunger) spreads the thermoplastic material out in a thin film, thus ensuring even and complete heating of the plastic material before it is extruded. One heating element may be connected directly across the power line and its predetermined value be such as to just balance the heat loss of the heating section, by radiation and to the air. The second (or, at least, the last) element is preferably thermostatically controlled. Such a combination of the two heating elements gives a rapid warmup time while holding a predetermined temperature with smaller variations.

The apparatus is capable of being altered by a simple adjustment to provide the correct amount of thermoplastic each time the trigger is pulled. The amount of thermoplastic discharged can be altered by shortening or lengthening the stroke of the piston. This versatility will facilitate the variety of end uses for which the apparatus will be used.

Usually, a means of softening the shock of the return stroke of the piston and plunger is incorporated into the design of the plunger mechanism. This feature, though not essential is desirable, particularly in one form of its incorporation into the design which also provides the plunger mechanism with a dust cover or seal to guard against the accidental spilling of thermoplastic granules or pellets into the mechanism. In addition to this, it can provide the operator a knob or both handle to test the apparatus plus a convenient means of checking the length of the stroke.

Provision may be made in the design of the nozzle and heating chamber assembly, to conveniently allow the interchanging of the nozzle. Thus, the nozzle may have one or more orifices or the diameter of the discharge orifice may be varied to allow different discharge characteristics. Also, the mounting of the nozzle allows an easy installation of a roller, journaled on a mounting bracket and used to roll out the hot melt adhesive into the form of a ribbon, or corrugated ribbon if the roller is ribbed. This of course would be done should this prove to be the preferred method of application on some particular type of job.

The apparatus is preferably equipped with a check valve near the tip of the nozzle to prevent drooling of the hot thermoplastic material. After the trigger has been pulled and the charge of thermoplastic has been ejected, the check valve closes. This innovation on a hand-held hot melt adhesive extruder and its adaptation to this apparatus is made possible only because of the high pressure available from the motor means to overcome the back pressure available from the motor means to which will normally accompany the incorporation of such a check valve. This innovation certainly makes the apparatus operate cleanly but, more important, it makes the apparatus safer for common usage.

During the construction or manufacture of the device, there is considerable variation in the choice of cyclic time which can be made. This allows different models to be available on the same basic design. This can be done by the choice of the electric motor and of the ratio of the two gears which are incorporated into the design. The electric motor can be either a small universal AC-DC type, or for slower cyclic times, a shunt wound DC type on the same size frame can be used. The power to the motor would then be supplied by a bridge rectifier employing solid state rectifiers. The bridge rectifier would be housed in the spare space in the lower part of the handle.

The fact that this design is primarily for a hand-held device (with the handle positioned beneath and behind the container, and directly beneath the motor) does not exclude the use of the apparatus in a fixed position on a production line. This can be done by merely clamping it in position by the handle and operating the trigger by means of an electric solenoid or a cam-actuated lever.

Other objects and advantages will become apparent from the following detailed description which is to be taken in conjunction with the accompanying drawings illustrating preferred embodiments of the present invention in which:

FIG. 6 is a view in side and end elevation of a portion of the heating chamber, the nozzle, together with an optional grooved roller and its attachment bracket.

Figure 1:
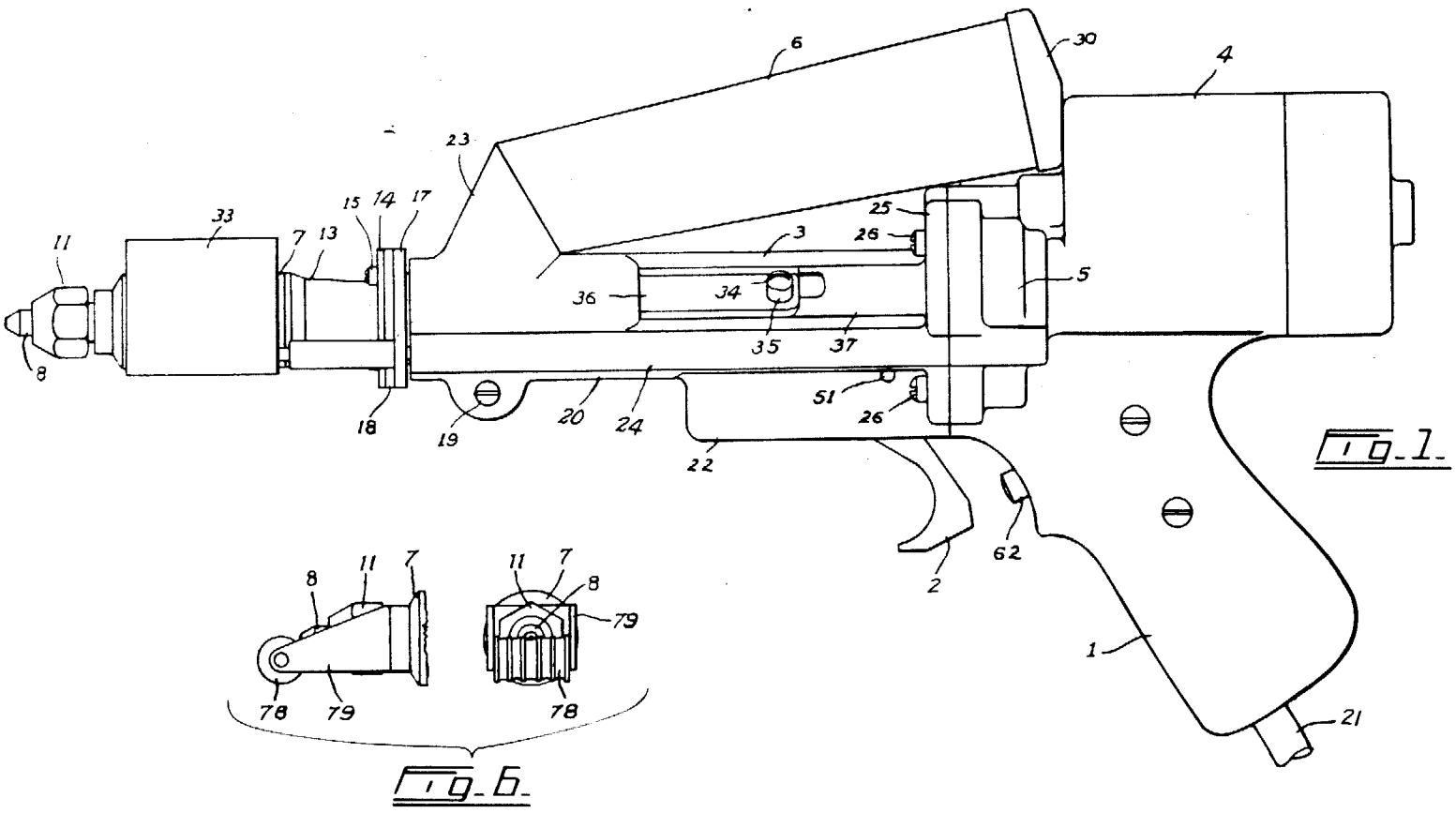
FIG. 1 is a view in side elevation of an applicator embodying the features of this invention. This view will illustrate the location of items which will not be apparent in the following sectional view.

In the drawings and particularly in FIG. 1, the general form of the apparatus is shown to be similar to that of a hand gun, having a handle or stock 1 and a trigger 2 to actuate a plunger mechanism 3. An electric motor 4 is located directly above the handle. A gear box 5 which contains two gears to transfer the motor drive to the plunger mechanism, is attached to both the motor housing and the handle. Fastened to the gear box housing is a plunger mechanism housing 20 and directly above the gear box housing and plunger mechanism housing is a cartridge container 6, for the gravity feed of thermoplastic pellets or granules. Fastened to the end of the plunger mechanism housing is a heating chamber 7 and a nozzle 8.

Figures 2, 3, 4, 5:
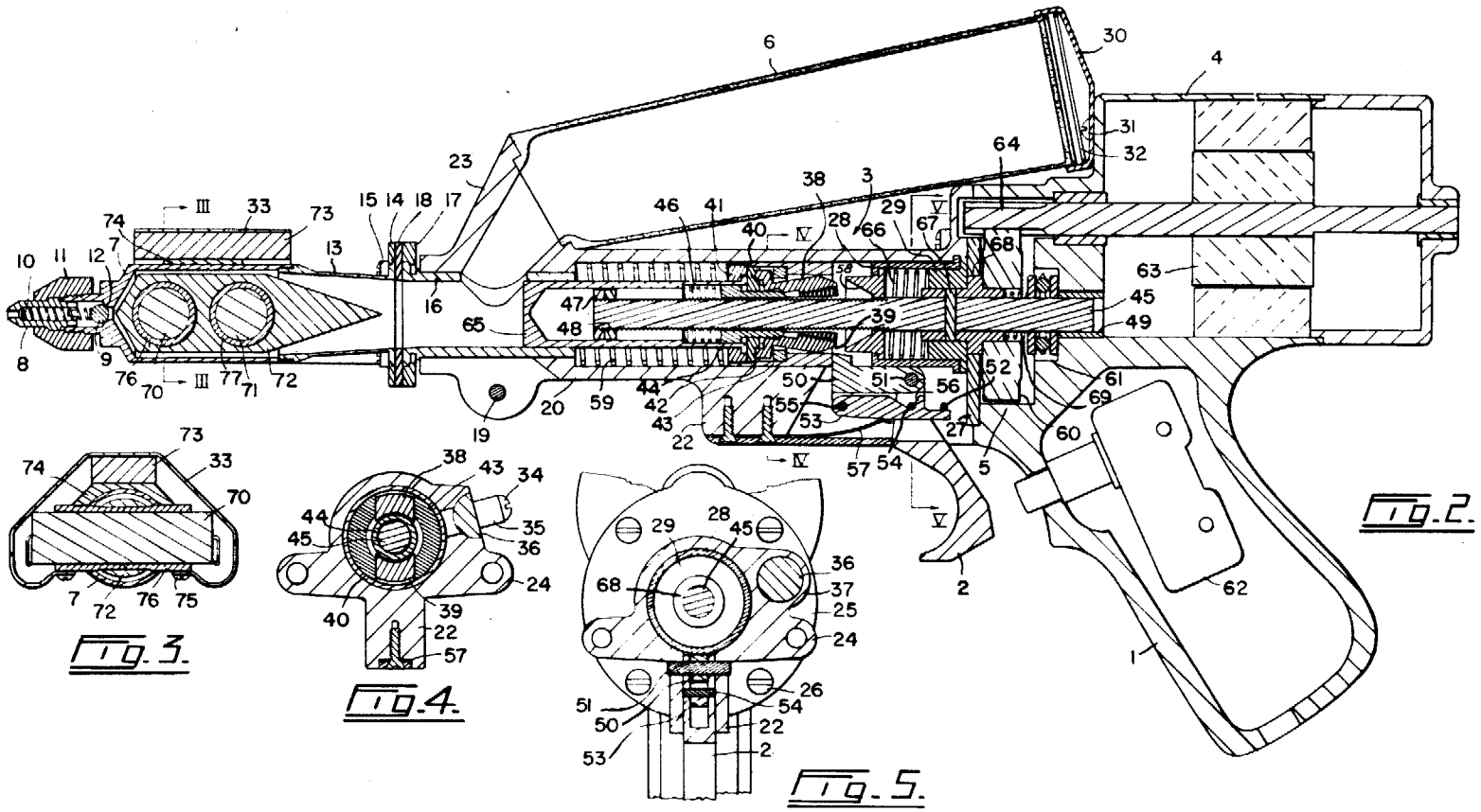
FIG. 2 is a side elevation sectional view with the interior of the electric motor completed only as it relates to this invention.
FIG. 3 is a sectional view taken along lines 3—3 of FIG. 2 illustrating the method of positioning the coaxially mounted, conical ended, core member by means of the heating element tubular enclosures; the heating elements; and the thermostat and its mount. This view also shows the passageway for the molten thermoplastic material.
FIG. 4 is a sectional view taken along lines 4—4 of FIG. 2 illustrating the cross section through this region of the plunger mechanism and the method of providing conduit tubes for the electrical wiring to the heating elements.
FIG. 5 is a sectional view taken along lines 5—5 of FIG. 2 and extending to the gear box cover.

In FIG. 2 and FIG. 3 (the sectional elevation drawings) the heating section, constituted by the chamber 7 and a conical ended core 72, has mounted therein by means of tubular enclosures 76 and 77, two heating elements 70 and 71. The heating section with its thermostat 73 is enclosed by a shield 33. The shield is fastened to a thermostat mount 74 by two screws 75. The nozzle 8 containing a coil spring 10 along with a ball 9 is attached to the heating section by means of the retaining nut 11. The ball is held by the coil spring in a seat 12 formed at the opening to the heating section. This spring has just sufficient tension to prevent drooling of the molten thermoplastic material and yet allows the ball to become unseated when the molten thermoplastic is under pressure. The passage in the nozzle containing the spring is slotted at the end to prevent any possibility of the ball closing the passage. This passage leads to one or more orifices.

The heating section chamber 7 is joined by means of a screwthread to a tapered, flanged tube 13. The tapered section of the tube is fabricated from a metal such as steel or stainless steel to a rather thin cross section. The integral flange on the end of the tapered tube is clamped by means of a recessed washer 14, four screws 15 and a similarly recessed plate 17, to a similarly recessed plate 17, to a similar flange on the end of the cylinder barrel 16. Sandwiched between the washer and plate is a nonmetallic washer 18 of a heat-insulating material such as red fibre or micalex. The cylinder barrel is clamped by means of screw 19 into the housing of the plunger mechanism 20.

The plunger mechanism housing 20 is cast or molded in one piece with the housing 22 for the trigger mechanism, a recessed mount 23 for the removable cartridge 6, to conduit tubes 24 for the electric wires to the heating elements, and the cover 25 for the gear box housing. The cover for the gear box housing also serves to fasten the plunger mechanism housing to the gear box housing by means of the four screws 26. The washer 27 is notched to clear the gear on the motor shaft and is a close fit in recesses formed partway into both the gear box cover and the gear box housing proper. The purpose of this washer is to keep these two units in coaxial alignment and also to keep the plunger mechanism parts 28 and 29 clamped in place.

The gear box housing 5 is cast or molded integral with one section of the motor housing 4 and with the handle 1. A shallow receptacle 30 is mounted by means of screws 31 to the face of the motor housing. Into this receptacle is affixed the spring 32, and as can be observed by studying FIG. 2, that by grasping the cartridge container 6 in one hand and pressing it toward the receptacle, the open end of the cartridge will become disengaged from its support 23 on the plunger mechanism housing 20. An empty cartridge can thus be easily interchanged with another that has been filled with thermoplastic granules or pellets. The handle is fashioned with a cavity, of sufficient size to contain the microswitch 62 and the electrical connections to the power cord 21.

In FIGS. 1, 4 and 5 attention is drawn to the bolt 34, the sleeve 35 and particularly to item 36. This item acts as a sliding dust cover for the plunger mechanism while the cylindrical end operates as a piston inside of a close fitting closed end cylinder. This cylinder 37 is also cast or molded integral with the plunger mechanism housing 20. The end of the cylinder is closed by butting up against the washer 27. The purpose of this piston and cylinder is to reduce the shock of the return stroke of the plunger mechanism 3, a description of which now follows.

The plunger mechanism is composed of two threaded half-nuts 38 and 39 and their mounting. A short tubular section 40 having an internal step or shoulder is internally threaded on one end to fit the piston retainer-ring 41. This ring also clamps into position, the half-nut seat-washer 42 and the slotted half-nut support 43. The half-nut seat-washer is machined with a radiused groove on one face. This groove anchors the unthreaded ends of the half-nuts radially while the slot in the half-nut support, anchors the half-nuts circumferentially. The radius in the groove matches the radius formed on the half-nuts and sufficient clearance is allowed between the bottom of the groove and the bottom of the slot in the half-nut support to allow the threaded ends of the two half-nuts to swivel outward; at the two half-nuts swiveling on the matching radii. A suitably shaped sleeve 44 is free to slide to and fro on the threaded driving shaft 45 and holds the two half-nuts apart by the pressure of spring 46. This sleeve also serves to drive the two half-nuts apart when the plunger mechanism assembly has reached the end of its predetermined stroke. The length of the stroke is determined by the position of the two nuts 47 and 48 locked onto the threaded driving shaft. The threaded driving shaft is free to rotate in the sleeve bearings 29 and 49.

Reference is now made to that portion of the plunger mechanism housing which constitutes the housing for the trigger mechanism 22. The trigger 2 and the sear 50 are both free to swivel about pin 51; this pin is fixed to the trigger housing by passing through a tight fitting hole. Pin 52 is also fixed to the trigger housing in a similar manner and acts to drive the linkage 53 free of pin 54 which is fixed to the trigger. The linkage is notched to engage pin 54 and incorporated with the notch is a ramp 56. The linkage, being hinged to the other end of the sear by pin 55, causes the sear to swivel with the trigger until the notch in the end of the linkage is disengaged from pin 54. The leaf spring 57 acts to return the sear to the stop position, also to engage the notch in the linkage to pin 54 and with the aid of the ramp 56 to return the trigger to the ready position.

When the plunger mechanism is released by the sear 50, it is pushed toward the funnel-like opening of the closure 58 by pressure from the spring 59. This spring is designed to have sufficient force to overcome the action of spring 46 acting on sleeve 44 and acts to close the two half-nuts onto the threaded driving shaft 45. This action is accomplished by the open ends of the half-nuts sliding down the inclined surface of the closure. To complete the closing action of the two half-nuts onto the threads, the threaded driving shaft must be free to travel axially with the two half-nuts for a short distance. This distance is determined by how coarse the driving threads are on the half-nuts and the threaded driving shaft but is not critical, a small amount of excess travel allowance being satisfactory. The threaded driving shaft has firmly fastened to it by means of pin 67, the flanged journal sleeve 68. The gear 60 is a tight press fit onto the flanged journal sleeve. The shaft by sliding axially in the two bearings 29 and 49 is free to retreat, compressing spring 69 until the gap between gear 60 and the bal lthrust bearing 61 is closed. Incidental to the foregoing action is the influence of the spring 66 on the closure. Occasionally the rotational position of the threaded driving shaft is not suitable to allow the threads on the half-nuts to mesh with those on the shaft. The spring 66 then allows the closure to travel axially with the half-nuts and driving shaft. Now a partial turn of the driving shaft allows the threads to mesh and then spring 66 drives the closure over the half-nuts, thus completing the closing action of the half-nuts. Attention is again drawn to the half-nut seat-washer 42, particularly the radiused groove. Because this groove is further out radially than the threads on the threaded driving shaft, and because the bottom of this groove transmits the thrust of the spring 59 to the half-nuts 38 and 39, a counter-thrust by the threaded driving shaft will cause an inward swiveling force to the threaded ends of the two half-nuts. This action keeps the two half-nuts closed onto the threaded driving shaft.

The operator may at this time, press the trigger 2 a little further, whereupon the contacts in the microswitch 62 will be closed, activating the electric motor 63. Then the electric motor, through the pinion gear 64 and the gear 60, by means of the plunger mechanism 3 will drive the piston 65 further into the cylinder 16. The piston will push before it and compress, the pellets or granules of thermoplastic material which have fallen into the cylinder, from the cartridge container 6. The interior of the cartridge container is connected by a funnel-like opening, through the cartridge container mount 23 and through the cylinder barrel wall.

Turning our attention now to the movement of the thermoplastic material through the cylinder barrel, we find that the pellets or granules are increasingly heated and that they are then compressed by the pressure from the piston into a viscous wad. The viscous wad, when driven further into the hotter sections of the apparatus, is heated further, and is increasingly compacted. The tendency for the thermoplastic material, due to this increase in heating and compacting, is to stick to the confining walls. We thus have a situation where the pressure of the piston increases the compacting and the compacting increases the back pressure of the thermoplastic material; hence the force required by the piston to move the material is unnecessarily increased. The situation as described above, not only would require a larger and heavier electric motor, but also, coupled with the fact that the apparatus will probably be used with considerable variations in time intervals, will cause variations in the amount of thermoplastic material extruded. Although small variations are acceptable for packaging and sealing of cartons, it would be desirable to keep them to a minimum.

The problem as outlined above is reduced by two innovations.

Firstly, is the gradually increasing bore diameter just beyond the head of the piston 65, of the cylinder barrel 16. From the position of the piston head at its furtherest excursion, the bore diameter is carried smoothly through the nonmetallic washer 18 and through the thin flanged tube section 13. The effect of this increasing bore diameter is to reduce the radial pressure of the moving, viscous, thermoplastic wad; hence the friction of the thermoplastic material on the confining walls is also reduced.

Secondly, by also having a rapid transition in the temperature of these confining walls. This rapid transition shortens the length of the sticky portion of the viscous thermoplastic wad and hence again reducing the friction between the thermoplastic material and the confining walls. The nonmetallic washer 18 together with the small cross-sectional area of the thin flanged tube section 13, effectively restricts the flow of heat from the heating section 7 of the apparatus to the cylinder barrel 16, while the short distance required by these two items to accomplish this, gives the desired rapid transition in temperature.

A contributing factor to the above-mentioned innovations is that in the heating section, the heating elements 70 and 71 are so located that their heat is applied directly to the conical ended core 72. In addition to this is the elongated conical point extending almost to the cylinder barrel 16. These two factors ensure that the melting of the thermoplastic material is largely carried out at the core, and as the core is practically at the same high temperature throughout its entirety, there is no temperature transition problem and the molten thermoplastic acts as a lubricant rather than as a sticky mass.

While the foregoing innovations are essential to achieve a lightweight compact device, they have also provided a bonus in that smaller quantities of thermoplastic material may be ejected with close control, both in regard to the actual amount of material and also with a rapid start of flow and a sharp cutoff. This latter feature is evident in that the molten material is actually ejected with sufficient velocity to break clear of the nozzle and can be squirted or shot over a short distance horizontally. This feature makes feasible the use of multiple orifices in the nozzle.

Referring now to FIG. 6, there is illustrated a side and end elevation view of the nozzle 8 and its retaining nut 11; the end of the heating section chamber 7, with the rest of the apparatus broken away. These views show how an optional roller 78 may be attached to the end of the heating section. The attachment is accomplished by means of the bracket 79 clamped to the end of the heating section chamber by means of the nozzle retaining nut. The roller and bracket are heated by conduction from the heating section and may be used to spread the ejected molten plastic into the form of a corrugated ribbon.

In operation, a cartridge container, which has been filled with thermoplastic pellets or granules, is inserted in place; and the power cord is plugged into a suitable power source. After a short waiting period, the trigger may be pulled. If the trigger is pulled prematurely, no harm will result because the plunger mechanism is sufficiently sturdy to stall the motor if necessary. Of course this is not recommended as a standard procedure for obvious reasons. When the temperature is sufficiently high, the plastic will be ejected, the ejection stroke taking approximately one third of a second. In use the applicator is held in the hand at an angle of about 45° with the roller resting on the carton. The trigger is now pulled while the applicator is pushed or pulled over the surface. The trigger is pulled repeatedly as many times as is necessary to lay a straight or ziz-zag pattern of molten material of whatever length is desired. Now the operator uses his free hand to close the flap on the carton and to apply a light pressure directly over the adhesive areas. This method of laying the molten thermoplastic material gives a corrugated ribbon, of varying width and thickness, applied in a very short period of time. Hence, when the carton flap is pressed closed, the thin portions of the plastic ribbon being slightly cooler, give an early holding strength; this holds the flap down against any springiness of the material, and gives the thicker and hotter portions of the plastic ribbon, time to penetrate into the carton surfaces before cooling and hardening.

To make small volume injection molded objects, the roller attachment is left off, and the nozzle tip is pressed into the mold gate. The trigger is then pulled in rapid succession till the sound of the motor and plunger mechanism indicates that the mold has been filled. The device is capable of injecting the plastic material into the mold at a fairly high pressure, so it can produce molded pieces that have thin weblike features. Molded objects can be produced that show no sign of the fact that the plastic material has been injected into the mold in a pulsed flow. The device can be used to injection-mold a polyethylene jacket over electrical wire connection joints. To accomplish this, a split mold is used, which has the required number of openings to accommodate the number of wires in the particular joint. To facilitate this type of work being done outdoors, away from a standard electrical outlet, a model of the device can be made that will operate from a lead acid storage battery. This would merely require a change in the value of the resistance heating elements and the electric motor wiring.

Thus, the aforementioned objects and advantages are most effectively attained. Although several preferred embodiments of the invention have been disclosed therein, it should be understood that the present invention is in no sense limited thereby and should be determined by the scope of the appended claims.

I claim:

1. A gun-type applicator for dispensing a molten material, comprising:

a frame having thereon a hand grip for supporting the frame with one hand;

a barrel projecting from the forward end of said frame;

a nozzle mounted on the forward end of said barrel in communication with the bore thereof;

a piston mounted to reciprocate in the bore of said barrel coaxially thereof;

a heating chamber interposed between and communicating with said barrel and said nozzle;

a motor mounted on said frame rearwardly of said barrel and operable to effect reciprocation of said piston; and means for mounting on said frame a supply of material that is to be melted, and operative each time said piston moves rearwardly in said barrel to deliver a charge of said material into said barrel bore between said piston and said heating chamber to be forced by said piston successively through said chamber and said nozzle;

said mounting means comprising a duct positioned above said barrel and communicating at its lower end with the bore of said barrel rearwardly of said chamber, first holding means on the opposite end of said duct for receiving and releasably holding in communication with said duct one end of a detachable supply cartridge containing in particulate form the solid material that is to be melted, and second holding means on said frame above and rearwardly of said first holding means for receiving and holding the other end of said cartridge in such position that the cartridge is inclined downwardly from said other end toward said one end thereof.

2. A gun-type applicator as claimed in claim 1, provided with valve means between the orifice of said nozzle and said heating chamber, said valve means being biased to prevent escape of molten material when said piston is inoperative.

3. A gun-type applicator as claimed in claim 1, wherein adjacent said barrel the wall of said heating chamber is substantially thinner than the wall of said barrel thereby to restrict the conduction of heat between said heating chamber and said barrel.

4. A gun-type applicator as claimed in claim 3 including a nonmetalic heat-insulating washer fastened between the wall of said heating chamber and said barrel.

5. A gun-type applicator for dispensing a molten material, comprising:

a frame having thereon a hand grip for supporting the frame with one hand;

a barrel projecting from the forward end of said frame;

a nozzle mounted on the forward end of said barrel in communication with the bore thereof;

a piston mounted to reciprocate in the bore of said barrel coaxially thereof;

a heating chamber interposed between and communicating with said barrel and said nozzle;

a motor mounted on said frame rearwardly of said barrel and operable to effect reciprocation of said piston; and means for mounting on said frame a supply of material that is to be melted, and operative each time said piston moves rearwardly in said barrel to deliver a charge of said material into said barrel bore between said piston and said heating chamber to be forced by said piston successively through said chamber and said nozzle;

a metallic, cylindrical core mounted in said chamber in radially spaced relation to the wall of said chamber, so that the material to be melted passes axially through said chamber around the outside of said metallic core on its way to said nozzle; and at least one heating element extending transversely through both said core and the wall of said chamber.

6. A gun-type applicator as claimed in claim 5, wherein:

the inner end of said metallic core tapers to a point facing in the direction of said piston; and the portion of said chamber wall surrounding said inner end of said core tapers slightly in the same direction as said inner end of said core.

7. A gun-type applicator as claimed in claim 6, wherein said heating element is provided with thermostat heat control means.

8. A gun-type applicator for dispensing a molten material, comprising:

a frame having thereon a hand grip for supporting the frame with one hand;

a barrel projecting from the forward end of said frame;

a nozzle mounted on the forward end of said barrel in communication with the bore thereof;

a piston mounted to reciprocate in the bore of said barrel coaxially thereof;

a heating chamber interposed between and communicating with said barrel and said nozzle;

a motor mounted on said frame rearwardly of said barrel and operable to effect reciprocation of said piston;

means for mounted on said frame a supply of material that is to be melted, and operative each time said piston moves rearwardly in said barrel to deliver a charge of said material into said barrel bore between said piston and said heating chamber to be forced by said piston successively through said chamber and said nozzle;

said motor being an electric motor;

trigger means on said hand grip manually operable selectively to energize said motor;

a drive shaft rotatably mounted in said frame and operatively connected to said motor for rotation thereby, when said motor is energized; and releasable coupling means interposed between said piston and said shaft and operative intermittently to reciprocate said piston during the rotation of said shaft;

said shaft being externally threaded;

said coupling means comprising threaded means movable with said piston and releasably and drivingly engageable with the threads on said shaft to drive said piston axially in one direction upon rotation of said shaft; and spring means connected to said piston and operative rapidly to return said piston in the opposite direction upon release of said threaded means from engagement with said shaft.

9. A gun-type applicator as claimed in claim 8, including:

clamping means operative in response to the operation of said trigger means releasably to engage said threaded means drivingly with said shaft; and releasing means operative automatically to release said threaded means from driving engagement with said shaft after predetermined movement of said piston in said one direction.

10. A gun-type applicator as claimed in claim 9, wherein:

said threaded means comprises a pair of internally threaded half-nuts releasably engageable with said shaft at diametrically opposite sides thereof, and having segmental conical surfaces on the ends thereof facing rearwardly of said barrel, and said clamping means comprises a clamping member surrounding said shaft adjacent the rear end thereof and having a conical bore confronting said segmental conical surfaces to engage and force the latter radially inwardly releasably to engage said half-nuts drivingly with said shaft upon operation of said trigger means.

11. A gun-type applicator as claimed in claim 10, wherein:

a stop is secured to said shaft adjacent the forward end thereof in axially spaced relation to said clamping member; and said releasing means comprises a further member reciprocable with said piston axially of said shaft and engageable with said stop, when said piston has moved said predetermined distance in said one direction, to be moved by said stop into contact with said half-nuts to disengage the latter from said shaft.

*12. An applicator for melting a solid thermoplastic adhesive material and dispensing it in a molten form, comprising*

*a frame,*

*a barrel mounted upon said frame, a bore extending through said barrel;*

*a nozzle in communication with said bore;*

*a piston mounted to reciprocate in the bore of said barrel coaxially thereof;*

*a heating chamber interposed between and communicating with said barrel and said nozzle;*

*a motor mounted on said frame rearwardly of said barrel and operable to effect reciprocation of said piston;*

*means for supplying solid material that is to be melted to said barrel and operative each time said piston moves rearwardly in said barrel to deliver a charge of said material into said barrel bore between said piston and said heating chamber to be forced by said piston successively through said chamber and said nozzle;*

*a metallic, cylindrical core mounted in said chamber in radially spaced relation to the wall of said chamber, so that a major portion of the material to be melted passes axially through said chamber around the outside of said metallic core on its way to said nozzle;*

*at least one heating element for melting material in said heating chamber; and*

*thermal insulating means located closely adjacent the*

*rearward end of said core to effectively restrict the flow of heat from said heating chamber into said barrel.*

*13. An applicator as claimed in claim 12, wherein the inner end of said metallic core tapers to a point facing in the direction of said piston.*

*14. The applicator as claimed in claim 13, wherein a portion of said chamber wall surrounding said inner end of said core tapers slightly in the same direction as said inner end of said core.*

*15. An applicator as claimed in claim 12, wherein said heating element is provided with thermostat heat control means.*

*16. An applicator as claimed in claim 12 wherein said heating element is at least partially located within said core.*

*17. A gun-type applicator for dispensing a molten material, comprising:*

*a frame having thereon a hand grip for supporting the frame with one hand;*

*a barrel projecting from the forward end of said frame;*

*a nozzle mounted on the forward end of said barrel in communication with the bore thereof;*

*a piston mounted to reciprocate in the bore of said barrel coaxially thereof;*

*a heating chamber interposed between and communicating with said barrel and said nozzle;*

*a motor mounted on said frame rearwardly of said barrel and operable to effect reciprocation of said piston; and*

*means for mounting on said frame a supply of material that is to be melted, and operative each time said piston moves rearwardly in said barrel to deliver a charge of said material into said barrel bore between said piston and said heating chamber to be forced by said piston successively through said chamber and said nozzle;*

*a metallic core mounted in said chamber in radially spaced relation to the wall of said chamber, so that the material to be melted passes axially through said chamber around the outside of said metallic core on its way to said nozzle; and*

*at least one heating element at least partially located within said core.*

*18. A gun-type applicator for dispensing a molten material, comprising:*

*a frame having thereon a hand grip for supporting the frame with one hand;*

*a barrel projecting from the forward end of said frame;*

*a nozzle mounted on the forward end of said barrel in communication with the bore thereof;*

*a piston mounted to reciprocate in the bore of said barrel coaxially thereof;*

*a heating chamber interposed between and communicating with said barrel and said nozzle;*

*a motor mounted on said frame rearwardly of said barrel and operable to effect reciprocation of said piston;*

*means for mounting on said frame a supply of material that is to be melted, and operative each time said piston moves rearwardly in said barrel to deliver a charge of said material into said barrel bore between said piston and said heating chamber to be forced by said piston successively through said chamber and said nozzle;*

*a metallic core mounted in said chamber in radially spaced relation to the wall of said chamber, so that the material to be melted passes axially through said chamber around the outside of said metallic core on its way to said nozzle;*

*thermal insulating means located closely adjacent the rearward end of said core to effectively restrict the flow of heat from said heating chamber to said barrel; and*

*at least one heating element so positioned as to be operable to heat the core.*

*19. A gun-type applicator for dispensing a molten material, comprising:*

*a frame having thereon a hand grip for supporting the frame with one hand;*

*a barrel projecting from the forward end of said frame;*

*a nozzle mounted on the forward end of said barrel in communication with the bore thereof;*

*a piston mounted to reciprocate in the bore of said barrel coaxially thereof;*

*a heating chamber interposed between and communicating with said barrel and said nozzle;*

*a motor mounted on said frame rearwardly of said barrel and operable to effect reciprocation of said piston;*

*means for mounting on said frame a supply of material that is to be melted so positioned as to be available each time said piston moves rearwardly in said barrel to deliver a charge of said material into said barrel bore between said piston and said heating chamber to be forced by said piston successively through said chamber and said nozzle;*

*a metallic core mounted in said chamber in radially spaced relation to the wall of said chamber, so that the material to be melted passes axially through said chamber around the outside of said metallic core on its way to said nozzle;*

*thermal insulating means located closely adjacent the rearward end of said core to effectively restrict the flow of heat from said heating chamber to said barrel; and*

*at least one heating element so positioned as to be operable to heat said core.*

*20. An applicator for melting a solid thermoplastic adhesive material and dispensing it in a molten form, comprising*

*a frame;*

*a barrel mounted upon said frame, a bore extending through said barrel;*

*a nozzle in communication with said bore;*

*a piston mounted to reciprocate in the bore of said barrel coaxially thereof;*

*a heating chamber interposed between and communicating with said barrel and said nozzle;*

*a motor mounted on said frame rearwardly of said barrel and operable to effect reciprocation of said piston;*

*means for supplying solid material that is to be melted to said barrel and operative each time said piston moves rearwardly in said barrel to deliver a charge of said material into said barrel bore between said piston and said heating chamber to be forced by said piston successively through said chamber and said nozzle;*

*a metallic, cylindrical core mounted in said chamber in radially spaced relation to the wall of said chamber, so that a major portion of the material to be melted passes axially through said chamber around the outside of said metallic core on its way to said nozzle;*

*at least one heating element for melting material in said heating chamber; and*

*thermal insulating means provided in the wall of said chamber at a location closely adjacent the rearward end of said core for effectively terminating conduction of heat along said wall from said heating element and being operable to minimize effectively the amount of plastic material in transition from a cold solid form to a hot molten form.*

(References on following page)

References Cited

The following references, cited by the Examiner, are of record in the patented file of this patent or the original patent.

UNITED STATES PATENTS

| | | | |
|---|---|---|---|
| 3,008,188 | 11/1961 | Harvey | 222—334 X |
| 2,995,159 | 8/1961 | Berggren | 219—227 |
| 3,377,012 | 4/1968 | Cushman | 222—146 HE |
| 3,311,952 | 4/1967 | Kovach et al. | 425—467 |
| 3,208,638 | 9/1965 | Frenzel et al. | 222—390 X |
| 2,567,960 | 9/1951 | Myers et al. | 222—387 X |
| 775,089 | 11/1904 | McClenahan | 18—3.5 |

| | | | |
|---|---|---|---|
| 1,621,308 | 3/1927 | Bersted | 222—390 |
| 1,644,173 | 10/1927 | Carr | 222—390 |
| 1,724,617 | 8/1929 | Rafellin | 222—390 |
| 1,792,656 | 2/1931 | Oalsley | 18—3.5 |
| 2,174,319 | 9/1939 | Gastrow | 222—146 HE |
| 2,459,296 | 1/1949 | Smith | 18—3.5 |
| 3,281,576 | 10/1965 | Coofer et al. | 222—390 X |
| 3,285,475 | 11/1966 | Phillips | 222—33 X |
| 2,928,574 | 3/1960 | Wagner | 222—262 X |

ROBERT B. REEVES, Primary Examiner

D. A. SCHERBEL, Assistant Examiner